July 1, 1930.  F. F. STARR  1,768,641

ELECTRICAL GENERATING SYSTEM

Filed Jan. 7, 1925

Inventor
Frank F. Starr
By Spencer Small and Ha Swan
Attorney

Patented July 1, 1930

1,768,641

UNITED STATES PATENT OFFICE

FRANK F. STARR, OF DAYTON, OHIO, ASSIGNOR TO DELCO-LIGHT COMPANY, OF DAYTON, OHIO, A CORPORATION OF DELAWARE

ELECTRICAL GENERATING SYSTEM

Application filed January 7, 1925. Serial No. 1,084.

This invention relates to electrical generating systems and more particularly to the type of system which includes an internal combustion engine for operating a dynamo electrical machine which is used as a motor with battery current for starting the engine, and when driven by the engine, as a generator for charging the battery and supplying electrical lighting and power circuits. The engine is started automatically in response to a certain demand for current and stops automatically when this demand ceases.

One of the objects of the present invention is to prevent unnecessary discharge of the storage battery, and this is accomplished by automatically stopping the cranking of the engine by the dynamo if the engine should fail to start within a reasonable time after a demand for current is made. This object is accomplished in the present invention also by preventing the use of more than a certain number of lights in case the engine should fail to start within a reasonable time. In case of failure to start, the lighting circuit will be automatically interrupted and cannot be maintained closed unless the demand for lights is not greater than that which the battery should normally supply.

A further object is to inform the operator that the plant has not been started automatically and is accomplished by automatically interrupting the lighting circuit.

Further objects and advantages of the present invention will be apparent from the following description, reference being had to the accompanying drawings wherein a preferred form of embodiment of the present invention is clearly shown.

Figure 1:
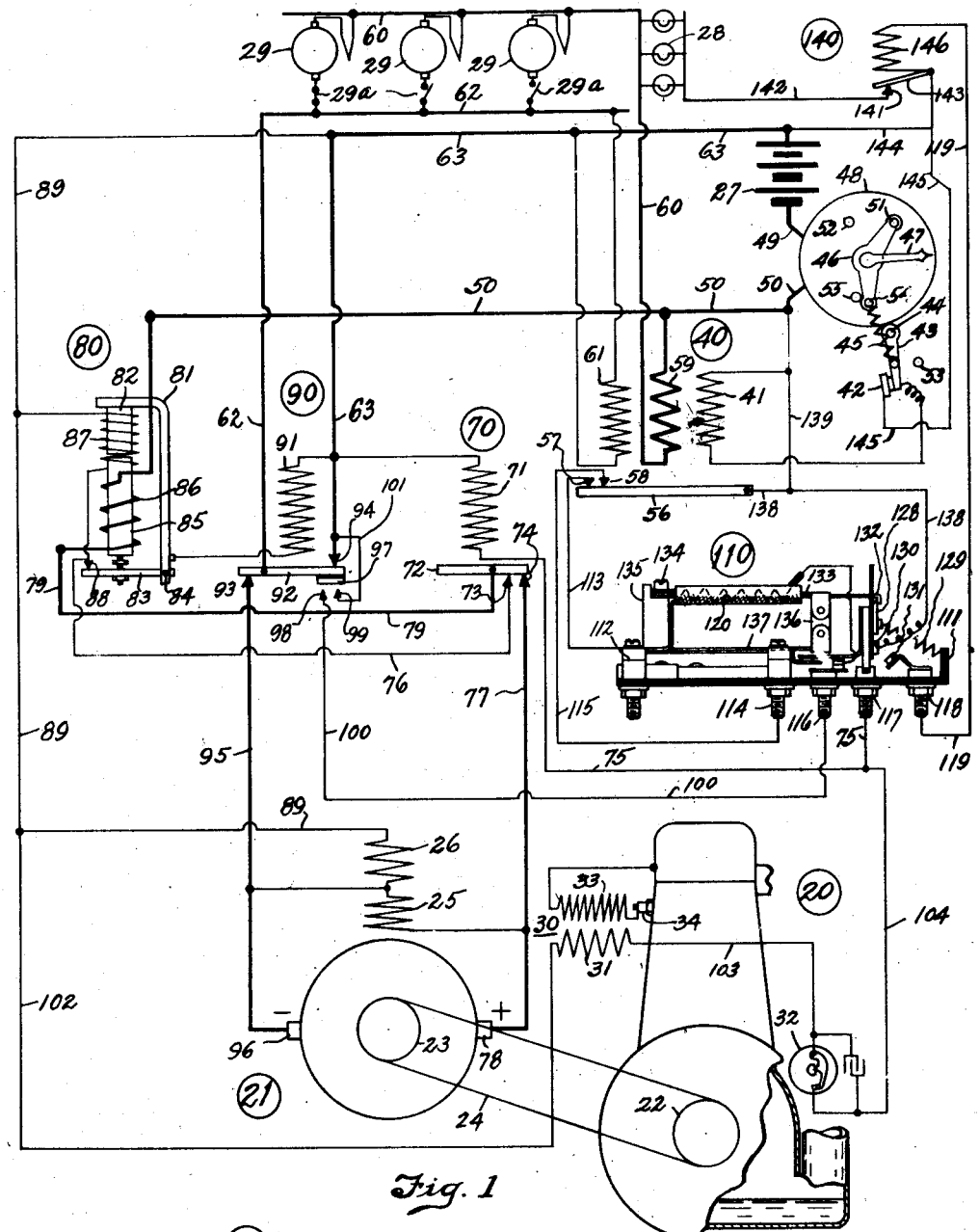
Fig. 1 is a wiring diagram showing one form of the invention.

Referring to the drawings, 20 designates an internal combustion engine which drives a dynamo electric machine 21 through any suitable mechanical drive such as pulleys 22 and 23 and belt 24. Dynamo 21 includes a shunt field winding 25 and a series field winding 26, the latter being used when the dynamo functions as a motor to start the engine.

Dynamo 21 is used to supply current for charging a storage battery 27 or for operating electric lamps 28 or electric motors 29. Ignition for the engine is provided by ignition coil 30 having a primary winding 31 which is connected in series with battery 27 and a timer 32 which is operated by the engine. Coil 30 includes a secondary 33 which is connected with an engine spark plug 34.

The automatic features of the present invention include a starting switch relay 40 which functions in response to a certain demand for current to cause a starting switch 70 to connect the battery 27 with dynamo 21 to operate the latter as a motor to crank the engine. After the engine becomes self-operative and drives the dynamo 21 as a generator, and when a certain amount of current is generating a load switch relay 80 will operate to cause the load switch 90 to connect the dynamo in such a manner as to supply the current demanded. When the demand ceases, the ignition circuit will be interrupted, the engine will stop and the dynamo will be automatically disconnected from the battery and other translation devices. In case the engine fails to start within a certain time the cranking cut-out 110 will operate to interrupt the ignition circuit, to interrupt the circuit between the battery and dynamo so that the dynamo cannot function as a motor and also to cause an automatic lighting circuit switch 140 to interrupt the lighting circuit. In this manner undue discharge to the storage battery is prevented if the engine fails to start.

The starting switch relay 40 includes a winding 41 which is connected with the battery 27 by means of a switch including a stationary contact 42 and a movable contact 43 which is pivoted at 44. Contact 43 is connected by a spring 45 and with a lever 46 which is pivotally mounted concentrically with the indicator 47 of an ampere-hour-meter 48. Ampere hour-meter 48 is connected with wire 49 with the battery 27 and is connected with wire 50. When the battery is being charged, the hand 47 will rotate counterclockwise and will finally engage a pin 51 carried by the lever 46 and will cause lever 46 to move into engagement with a stop 52. When this occurs the spring 45 will have been shifted to the right of the pivot 44 of the contact 43 so that said contact will move against a stop 53. When this occurs the circuit including the magnet coil 41 will be interrupted. Conversely, the discharging of the battery causes the hand 47 to rotate clockwise until it engages a pin 54 carried by the lever 46 and causes the lever 46 to move against a stop 55, thereby causing contact 43 to engage contact 42 as shown in the drawings. This event will cause the magnet coil 41 to be connected with the battery 27 and the armature 56 will be attracted to connect the switch contacts 57 and 58. This operation will effect the operation of the starting switch 70 in a manner to be described.

The relay 40 includes other magnet coils which are capable of attracting the armature 56. One of these coils is designated by numeral 59 and is connected with wire 50 and with wire 60 to which the lights 28 are also connected. When there is demand for lighting current in excess of a certain amount, the magnet coil 59 will be energized sufficiently to attract armature 56 into circuit closing position.

The starting switch relay 40 includes still another magnet coil 61 which when energized will cause movement of the armature 56 to connect contacts 57 and 58. Coil 61 is responsive to the closing of one of the switches 29ᵃ located adjacent a motor 29 or other translation device and connected with a wire 62 which is a part of the power circuit including the motor 29. The other end of the magnet coil 61 is connected with a wire 63 which is connected with the battery 27.

The starting switch 70 includes a magnet coil 71 which is energized by the connections of contacts 57 and 58 by the armature 56. When energized, coil 70 attracts an armature 72 into position for connecting contacts 73 and 74. One end of coil 71 is connected with wire 63 and the other end with a wire 75 leading to a terminal of the cranking cut-out 110. The contact 73 is connected with a wire 76 leading to one of the contacts of load switch relay 80. The contact 74 is connected with wire 77 leading to a dynamo brush 78. The pivot point of the armature 72 is connected by wire 79 with the load switch relay 80.

The load switch relay 80 includes magnet frame 81 supporting a stationary core 82 and an armature 83 pivoted at 84. Armature 83 is connected with a plunger 85 which extends within a magnet winding 86 and part way within a magnet winding 87 which surrounds the core 82. Winding 86 is connected with wire 79 and with wire 50. Winding 87 is connected with a contact 88 which is connected by wire 76 with contact 73 of the starting switch 70. The other end of winding 87 is connected by wire 89 which is connected with one end of the series field winding 26 of the generator 21. For a more detailed description of the starting switch relay reference is made to the copending application of Joseph C. Federle, Serial Number 592,155, filed October 3, 1922.

The load switch 90 includes a magnet coil 91 having one end connected with wire 63 and the other end with the frame 81 of the starting switch relay 80, and thus with the armature 83. The engagement of the armature 83 with the contact 88 will cause the winding 91 to be energized to attract the armature 92 into a position for connecting the wire 62 attached to the armature 92 with a contact 93 and a contact 94. Contact 94 is connected with wire 63 and the contact 93 is connected by wire 95 with the dynamo brush 96. As shown in Fig. 1 the shunt field 25 is connected between the wires 95 and 77 and one end of the series field is connected with wire 95. When the magnet winding 91 is not energized the armature 92 is disengaged from contacts 93 and 94, and the contact 97, insulatingly mounted on the armature 92 engages contacts 98 and 99. Contact 98 is connected by wire 100 with a terminal of the cranking cut-out 110. The contact 99 is connected by wire 101 with wire 63.

One end of the ignition primary 31 is connected by wire 102 with wire 89 and the other end is connected by wires 103 with timer 32 which in turn is connected by wire 104 with wire 75.

Figure 2:
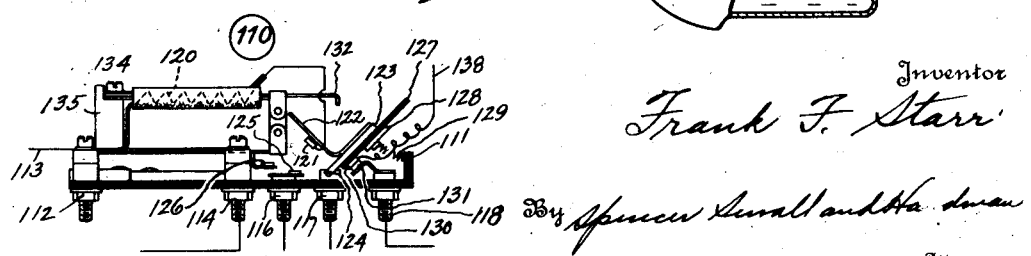
Fig. 2 is a diagram of certain apparatus shown in Fig. 1, the apparatus being shown in a different position of operation.

The cranking cut-out 110 includes a base 111 which insulatingly supports a terminal 112, connected by wire 113 with contact 57 of the starting switch relay 40, a terminal 114 connected by wire 115 with contact 58, terminal 116 connected with wire 100, a terminal 117 connected with wire 75 and a terminal 118 connected with a wire 119. Terminal 112 is connected with a heating coil 120 the other end of which is connected with a movable contact 121 insulatingly supported by a spring contact 122 which is attached to a conductor 123 pivotly mounted at 124 upon the terminal 117 (see Fig. 2). Contact 121 is adapted to engage contact 125 attached to terminal 114. Conductor 123 carries a non-conducting handle 127 which supports a latch plate 128 connected by spring 129 with the base 111. The spring 129 tends to maintain a contact 130, insulatingly supported by the handle 127, in engagement with the contact 131 attached to terminal 118. In order to maintain contacts 122 and 126, contacts 121 and 125 in engagement, there is provided a latch hook 132 adapted to engage the latch plate 128 as shown in Fig. 1. The latch hook 132 is an extension from a bimetallic thermostat blade 133 which is surrounded by the heating coil 120 and is attached by screw 134 to block 135 supported by the base 111. The blade 133 is so arranged that when heated above the surrounding atmosphere it tends to bow away from the base 111. The blade 133 is attached by link 136 to a bi-metallic blade 137 which is arranged to bow toward the base 111 with increase of temperature. In this manner the cranking cut-out 110 is compensated for changes in environment temperature. The contact 130 is connected by wire 138 with armature 56 of the relay 40. Wire 138 is connected by wire 139 with the wire 50.

The lighting circuit cut-out switch 140 includes a contact 141 attached to wire 142 which forms a part of the lighting circuit including the lamps 28. Contact 141 is normally engaged by an armature 143 connected by wire 144 with battery 27. Wire 145 connects wire 144 with the contact 42 of the switch which is controlled by the ampere-hour-meter 48. Magnet coil 146 is connected with armature 143 and wire 119. When energized the coil 146 attracts the armature 143 to disconnect the battery from the lighting circuit.

*Mode of operation*

The operation of the invention is as follows:

Normally the armature 56 is out of engagement with the contacts 57 and 58; the armature 72 of the starting switch 70 is out of engagement with the contacts 73 and 74; the armature 92 of the load switch 90 is out of engagement with the contacts 93 and 94 and contact 97 connects contacts 98 and 99; and the armature 83 of the load switch relay 80 is out of engagement with contact 88. When there is a demand in the lighting circuit including lamps 28 in an excessive amount, the winding 59 will receive enough current from the battery to cause it to be energized to attract the armature 56 in position for connecting contacts 57 and 58. The plant may be started automatically by the demand for current by the battery 27. As previously explained, when the battery is discharged to a certain extent, the contacts 42 and 43 will be closed to connect the winding 41 with the battery. When this occurs the armature 56 will be moved into the position shown in Fig. 1. The closing of a switch in 29ª of the power circuit will cause the winding 51 to be connected with the battery and the armature 56 to move as shown.

Whenever the armature 56 connects the contacts 57 and 58 the magnet coil 71 of the starting switch 70 will be connected with the battery to the following circuit: battery 27, wire 49, meter 48, wire 50, wire 139, wire 138, armature 56, contact 58, wire 115, terminal 114, contact 126, contact 122, conductor 123, terminal 117, wire 75, coil 71, wire 63, back to battery 27. The armature 72 is therefore moved to connect the wire 79 with contacts 73 and 74. The following cranking circuit is therefore established: Battery 27, wire 49, meter 48, wire 50, magnet coil 86, wire 79, armature 72, contact 74, wire 77, dynamo brush 78, through the armature to dynamo brush 96, wire 95, series winding 26, wire 89, wire 63 back to battery 27. The shuntfield winding is also connected with the battery. The dynamo also operates as a compound motor to crank the engine. In case the engine becomes self-operative within reasonable time the cranking cut-out 110 will remain as shown in Fig. 1.

During the change of status of dynamo 21 from a motor to a generator, the current in the winding 86 will be reduced and then will reverse in direction. At a predetermined low value of current discharged from the battery through the winding 86 the winding 87 will be able to attract the armature 83 into position for engaging the contact 88. When this occurs the winding 91 will be energized to move the armature 92 into the position shown in Fig. 1. This will cause the series field 26 to be short circuited and the status of the dynamo to be changed from differential compound to simple shunt. Therefore the voltage of the generator will suddenly be increased. Movement of armature 92 causes the generator to be connected with the wire 62 which leads to the power circuit including the motors 29, and also breaks connection of the contacts 98 and 99 and therefore interrupts the circuit of the heating coil 120. In this system the connection of the generator with the power circuit is withheld until after the engine has become self-operative and the generator attains a certain voltage so that it is capable of supplying the needed current in the power circuit.

The cessation of demand in the power circuit, or decrease in demand for lighting current below a certain amount will cause the armature 56 to be released provided the winding 41 is not energized at this time. However, if this winding 41 be energized by the closing of contacts 42 and 43 the plant will continue to operate until the battery has reached a predetermined high state of charge. When the contacts 57 and 58 are disconnected the ignition circuit is interrupted and also the circuit of the starting switch coil 71. Therefore, the engine will stop and the dynamo will be disconnected from the battery and all of the control mechanism restored to the normal condition referred to.

While the full amount of current required to operate anyone of the power devices 29 is withheld until the generator is operated to supply the current, the current for the lighting circuit is not so withheld. The battery would be required to supply all of it in case the engine failed to start were it not for certain features of the present invention. Where the capacity of the battery is small (only sufficient for cranking and supplying current for a few lights) it is necessary that means be provided for preventing a prolonged discharge from the battery to the lighting circuit in case the engine does not start when the demand for lights exceeds a certain amount. This is accomplished in the present invention by the cranking cut-out which automatically causes the lighting switch 140 to function after a certain time. If the engine should fail to start within a reasonable time the blade 133 will be heated sufficiently to cause the hook 132 to move away from and release the latch plate 128. The spring 129 will cause the conductor 123 and parts carried thereby, to move into the position shown in Fig. 2. This operation causes the starting switch magnet 71 to be disconnected from the battery so that the armature 72 will be disconnected from the contacts 73 and 74. Therefore, the battery will be disconnected from the dynamo and from the relay magnet winding 87. The contact 121 will be separated from the contact 125 thereby disconnecting the battery from the heating coil 120. The contact 130 will engage a contact 131 and will cause the battery to be connected with winding 146 to the following circuit: battery 27, wire 49, meter 48, wire 50, wire 139, wire 138, contacts 130 and 131, wire 119, magnet coil 146, wire 144 back to battery 27. When this occurs the armature 143 will be separated from the contact 141 thereby causing the lighting circuit to be disconnected from the battery. The coil 146 is relatively high in resistance to prevent excess discharge of the battery through this coil.

In order that some lamps 28 may be burned while repairing or adjusting the plant so that electrical generation will be affected automatically, the operator will reduce the demand for lamps if said demand is not already below the amount required for starting the plant automatically, and then restore the cranking cut-out 110 to the status shown in Fig. 1 after of course waiting until the blade 133 has cooled sufficiently to allow the hook 132 to retain the latch plate 128.

In the present system, excessive discharge of the battery is prevented in the following ways:

(a) Current for the power circuit is withheld until after generating begins.

(b) Only a few lamps may be burned without initiating the generation of current, and, in case generation fails to begin within a reasonable time, the ignition circuit, the cranking circuit, the heating coil circuit of the cranking cut-out, and the lighting circuit are automatically interrupted.

In the present invention, the operator receives notice of failure of the engine to start, by failure of the lamps to burn when their circuit switches are closed. Usually the operator will not postpone fixing the plant, therefore the discharge of the battery through the lighting circuit switch coil 146 will be relatively slight as the rate of discharge would be low.

While the form of embodiment of the present invention as herein disclosed, constitutes a preferred form, it is to be understood that other forms might be adopted, all coming within the scope of the claims which follow.

What is claimed is as follows:

1. An electrical generating system comprising, in combination, a storage battery; a work circuit adapted to receive current from the battery; an internal combustion engine; electrical apparatus for cranking the engine and for supplying current to the work circuit; means for interrupting the flow of current from the battery to the work circuit; temperature responsive means adapted to prevent fruitless cranking of the engine and for rendering said interrupting means operative in the event of fruitless cranking; a heating coil circuit for said temperature responsive means rendered operable during the cranking operation; and means responsive to engine operation for rendering said heating coil circuit ineffective.

2. An electrical generating system comprising, in combination, a storage battery; a work circuit adapted to receive current from the battery; an internal combustion engine; electrical apparatus for cranking the engine and for supplying current to the work circuit; means for interrupting the flow of current from the battery to the work circuit; temperature responsive means adapted to prevent fruitless cranking of the engine and for rendering said interrupting means operative in the event of fruitless cranking; and means responsive to engine operation for rendering said temperature responsive means ineffective.

3. An electrical generating system comprising, in combination, a storage battery; a work circuit adapted to receive current from the battery; an internal combustion engine; electrical apparatus for cranking the engine and for supplying current to the work circuit; means for interrupting the flow of current from the battery to the work circuit; temperature responsive means adapted to prevent fruitless cranking of the engine and for rendering said interrupting means operative in the event of fruitless cranking; a heating coil circuit for said temperature responsive means; means for rendering said heating coil operative and for connecting the battery with the electrical apparatus for cranking the engine; and means responsive to engine operation for rendering said heating coil circuit ineffective.

4. An electrical generating system comprising, in combination, a storage battery; a work circuit adapted to receive current from the battery; an internal combustion engine; electrical apparatus for cranking the engine and for supplying current to the work circuit; means for interrupting the flow of current from the battery to the work circuit; a device operable to prevent fruitless cranking of the engine and for rendering said interrupting means operative in the event of fruitless cranking; a control circuit energized whenever the engine does not function properly and adapted to control said device; and means responsive to the engine operation for rendering said control circuit ineffective.

5. An electrical generating system comprising, in combination, a storage battery; a work circuit adapted to receive current from the battery; an internal combustion engine; electrical apparatus adapted to crank the engine and adapted to supply current to the work circuit; a circuit between the battery and electrical apparatus for supplying current to the electrical apparatus for cranking the engine for starting same and for supplying current to the electrical apparatus for cranking the engine when the engine becomes inoperative after being rendered operative; means for interrupting the flow of current from the battery to the work circuit; and means for preventing fruitless cranking of the engine whenever the engine does not function properly and for interrupting the flow of current to the work circuit and for maintaining said circuit interrupted in the event of fruitless cranking although the state of the battery charge is higher than the minimum desirable discharge condition.

6. An electrical generating system comprising, in combination, a storage battery; a work circuit adapted to receive current from the battery; an internal combustion engine; electrical apparatus adapted to crank the engine and adapted to supply current to the work circuit; and means for interrupting the flow of current from the battery to the work circuit and for maintaining said circuit interrupted whenever the engine does not function properly although the battery charge is higher than the minimum desirable discharge condition.

7. An electrical generating system comprising, in combination, an internal combustion engine; a dynamo operable as a motor to crank the engine or as a generator when driven by the engine; a storage battery charged by the generator; a work circuit supplied by the battery, or generator when operating; means for automatically causing the dynamo to crank the engine when the demand for current in the work circuit exceeds a certain amount; and means for automatically interrupting the work circuit whenever the engine does not function properly, said means having provisions permitting the maintenance of the connection of the battery and work circuit, provided the demand for current by the work circuit has been reduced below said certain value.

8. An electrical generating system comprising, in combination, an internal combustion engine, a dynamo operable as a motor to crank the engine or as a generator when driven by the engine; a storage battery charged by the generator, a work circuit supplied by the battery, or generator when operating; means for automatically causing the dynamo to crank the engine with battery current when the demand for current in the work circuit exceeds a certain amount, and means for automatically disconnecting the battery from the dynamo, and the work circuit from the battery, whenever the engine does not function properly, said means having provisions permitting the maintenance of the connection of the battery and the work circuit, provided the demand for current by the work circuit has been reduced below said certain value.

In testimony whereof I hereto affix my signature.

FRANK F. STARR.